United States Patent [19]

Miyake et al.

[11] Patent Number: 5,635,268
[45] Date of Patent: Jun. 3, 1997

[54] OPTICAL RECORDING MEDIUM

[75] Inventors: Takako Miyake; Shingo Iwasaki; Yasushi Araki; Takashi Chuman; Satoru Tanaka; Atsushi Yoshizawa; Fumio Matsui, all of Tsurugashima, Japan

[73] Assignee: Pioneer Electronic Corporation, Tokyo-to, Japan

[21] Appl. No.: 491,718

[22] Filed: Jun. 19, 1995

[30] Foreign Application Priority Data

Jun. 22, 1994 [JP] Japan ..................... 6-140576

[51] Int. Cl.[6] .................................... B32B 3/00
[52] U.S. Cl. .................. 428/64.1; 428/64.2; 428/64.4; 428/64.7; 428/64.8; 428/64.9; 428/446; 428/448; 428/913; 430/270.1; 430/270.11; 430/270.14; 430/495.1; 430/945; 369/283; 369/288
[58] Field of Search .................. 428/64.1, 64.2, 428/64.4, 64.7, 64.8, 64.9, 412, 446, 447, 448, 913; 430/270, 495, 945, 270.1, 270.11, 270.14, 495.1; 369/283, 288

[56] References Cited

U.S. PATENT DOCUMENTS

| | | | |
|---|---|---|---|
| 4,458,004 | 7/1984 | Tanikawa | 430/270 |
| 5,154,957 | 10/1992 | Yamada et al. | 428/64 |
| 5,354,590 | 10/1994 | Tamura et al. | 428/64 |
| 5,407,719 | 4/1995 | Hamada et al. | 428/64 |
| 5,424,171 | 6/1995 | Yanagisawa et al. | 430/271 |

FOREIGN PATENT DOCUMENTS

| | | |
|---|---|---|
| 0313943 | 5/1989 | European Pat. Off. . |
| 0395369 | 10/1990 | European Pat. Off. . |
| 0503774 | 9/1992 | European Pat. Off. . |
| 0514799 | 11/1992 | European Pat. Off. . |
| 0526224 | 2/1993 | European Pat. Off. . |
| 58-036490 | 3/1983 | Japan . |
| 60-190388 | 9/1985 | Japan . |

*Primary Examiner*—Newton Edwards
*Assistant Examiner*—Elizabeth Evans
*Attorney, Agent, or Firm*—Young & Thompson

[57] ABSTRACT

An optical recording medium is provided with: a first substrate of optically transparent type; a first recording layer formed on one surface of the first substrate, which includes phthalocyanine dye; a second substrate of optically transparent type; a second recording layer formed on one surface of the second substrate which includes phthalocyanine dye; a first elastic body layer formed on a surface of the first recording layer at a side opposite to the first substrate; a second elastic body layer formed on a surface of the second recording layer at a side opposite to the second substrate; and a bonding layer formed between the first elastic body layer and the second elastic body layer.

4 Claims, 7 Drawing Sheets

FIG. 6

| | | EXPERIMENTAL EXAMPLE | COMPARISON EXAMPLE 1 | COMPARISON EXAMPLE 2 | COMPARISON EXAMPLE 3 | COMPARISON EXAMPLE 4 |
|---|---|---|---|---|---|---|
| LAND RECORDING | RECORDING POWER | 7.1 mw | RECORDING IMPOSSIBLE | 7.6 mw | 13.6 mw | 13.6 mw |
| | BIT ERROR RATE | $2.0 \times 10^{-6}$ | RECORDING IMPOSSIBLE | — | $4.8 \times 10^{-3}$ | $8.5 \times 10^{-5}$ |
| GROOVE RECORDING | RECORDING POWER | 7.6 mw | RECORDING IMPOSSIBLE | 8.6 mw | 10.0 mw | 10.7 mw |
| | BIT ERROR RATE | $1.6 \times 10^{-4}$ | RECORDING IMPOSSIBLE | — | — | — |

— MEASUREMENT IMPOSSIBLE

FIG. 7

| | | TSE3331 | XE14-257 | TSE3033 | TSJ3130 | TSE3012 |
|---|---|---|---|---|---|---|
| JIS-A HARDNESS | | 60 | 36 | 30 | 22 | GEL CONDITION |
| LAND RECORDING | RECORDING POWER | 10.1 mw | FOCUS NOT CLOSED | 7.1 mw | 7.1 mw | 6.3 mw |
| | BIT ERROR RATE | — | FOCUS NOT CLOSED | $2.0 \times 10^{-6}$ | $3.2 \times 10^{-6}$ | $6.6 \times 10^{-5}$ |
| GROOVE RECORDING | RECORDING POWER | 11.4 mw | FOCUS NOT CLOSED | 7.6 mw | 7.4 mw | 6.6 mw |
| | BIT ERROR RATE | — | FOCUS NOT CLOSED | $1.6 \times 10^{-4}$ | $2.5 \times 10^{-3}$ | $1.4 \times 10^{-4}$ |

— MEASUREMENT IMPOSSIBLE

FIG. 8

| TYPE | | RESULT |
|---|---|---|
| WATER URETHANE EMULSION GROUP | (NOGAWA-CHEMICAL Co. DW771) | COLOR DEFECT IN DYE FILM |
| EPOXY GROUP | (SUMITOMO-KAGAKU Co. ELA-128) | COLOR DEFECT IN DYE FILM |
| EPOXY GROUP | (SHIKOKU-KASEI Co. FC A-2603 H-2601) | COLOR DEFECT IN DYE FILM |
| SILICON/ EPOXY GROUP | (KONISHI Co. MOS-10L) | COLOR DEFECT IN DYE FILM |
| STYRENE/ BUTADIENE RUBBER | (NIPPON ZEON Co. SBR-NS310) | RECORDING IMPOSSIBLE (NO DEFECT IN DYE FILM) |

OPTICAL RECORDING MEDIUM

BACKGROUND OF THE INVENTION

1. Field of the Invention

The present invention generally relates to an optical recording medium, and more particularly to an optical recording medium of write once read many type using organic dye film as a recording material.

2. Description of the Related Art

As a recording film of an optical disc of write once read many type, there is a film using organic dyes such as a cyanine group organic dye and a phthalocyanine group organic dye.

Recording information on this kind of optical disc of write once read many type is performed by condensing the laser beam to form a little spot on the organic dye film as the recording film, converting it to thermal energy, and forming a pit by changing the physical property such as the reflection coefficient, the planarity, the shape etc. of the recording film or by changing the chemical property.

More concretely, in the optical disc of write once read many type using the thermal discomposing property of the organic dye film, the information is recorded by sublimating the organic dye film by irradiating the laser beam, and forming an aperture.

In this kind of the optical disc of write once read many type by means of the aperture forming method, in order to easily perform the dispersion by the sublimation of the organic dye film, two substrates, to each of which the organic dye film (surface) is formed, are prepared. The organic dye films are opposed to each other and are bonded together through a spacer provided on internal and external circumferences of the substrate, so that the air sandwich structure is obtained.

In the optical disc of write once read many type by means of the aperture forming method by use of the above mentioned organic dye film, since a relatively large aperture is formed, there is a problem that the cross-talk amount is increased.

Since the air sandwich structure is employed, there is another problem that it is difficult to produce an optical disc having a relatively large area while retaining sufficient physical strength.

Further, there is another problem that the high recording power is required, since the heat energy is discharged by the sublimation to the space formed by the air sandwich structure at the time of recording.

SUMMARY OF THE INVENTION

It is therefore an object of the present invention to provide an optical recording medium, which can reduce the cross-talk amount due to the pit shape, which can be produced as an optical disc having a relatively large area, and which can be recorded even if the recording power is low.

The above object of the present invention can be achieved by a first optical recording medium provided with: a substrate of optically transparent type; a recording layer formed on one surface of the substrate, which includes phthalocyanine dye; and an elastic body layer formed on a surface of the recording layer at a side opposite to the substrate.

According to the first optical recording medium, since the elastic body layer is formed on the recording layer which includes the phthalocyanine dye, the deformation amount of the recording layer in case of recording the information to the recording layer is restrained by the elastic force of the elastic body layer. Thus, the pit shape can be made small as compared with the case where the recording layer faces to a free space as in the case of the air sandwich structure according to the related art. Therefore, the high density recording can be performed. Further, since such a structure can be obtained that the recording layer is adhered to the elastic body layer, the mechanical strength is improved. Furthermore, since the thermal energy is not discharged into the free space at the time of recording, the thermal energy can be efficiently utilized, so that the recording power can be reduced. Especially, in the first optical recording medium, the recording layer is protected by the elastic body layer, an optical recording medium of single substrate type using the organic dye can be realized.

In one aspect of the present invention, the first optical recording medium is further provided with a protection layer on a surface of the elastic body layer at a side opposite to the recording layer. Thus, the protection ability of the recording surface of the optical recording medium can be improved.

The above object of the present invention can be also achieved by a second optical recording medium provided with: a first substrate of optically transparent type; a first recording layer formed on one surface of the first substrate, which includes phthalocyanine dye; a second substrate of optically transparent type; a second recording layer formed on one surface of the second substrate which includes phthalocyanine dye; and an elastic body layer formed between the first recording layer and the second recording layer.

According to the second optical recording medium, since the first recording layer and the second recording layer, each of which includes the phthalocyanine dye, are formed such that the elastic body layer is disposed therebetween, the deformation amount of each recording layer at the time of recording is restrained by the elastic force of the elastic body layer. Thus, the pit shape can be made small, the high density recording can be performed, the mechanical strength is improved, and the recording power can be reduced in the same manner as the first optical recording medium of the present invention.

The above object of the present invention can be also achieved by a third optical recording medium provided with: a first substrate of optically transparent type; a first recording layer formed on one surface of the first substrate, which includes phthalocyanine dye; a second substrate of optically transparent type; a second recording layer formed on one surface of the second substrate which includes phthalocyanine dye; a first elastic body layer formed on a surface of the first recording layer at a side opposite to the first substrate; a second elastic body layer formed on a surface of the second recording layer at a side opposite to the second substrate; and a bonding layer formed between the first elastic body layer and the second elastic body layer.

According to the third optical recording medium, since the first elastic body layer, on which the first recording layer including the phthalocyanine dye is formed, and the second elastic body layer, on which the second recording layer including the phthalocyanine dye is formed, are bonded together through the bonding layer. Thus, the combination of the first elastic body and the first substrate and the combination of the second elastic body layer and the second substrate are substantially coincident to each other in the structure. Accordingly, in addition to the effect of the above described second optical recording medium, such an advantage that the production of the optical disc is easy can be obtained according to the third optical recording medium.

As the elastic body layer in each of the above described optical recording media of the present invention, a silicon polymer layer having a hardness of not more than 30 degrees according to a hardness test of JIS (Japanese Industrial Standard)—A type spring method may be employed.

As the recording layer in each of the above described optical recording media of the present invention, such a recording layer which has a thickness of 20 to 150 nm may be employed.

In another aspect of the present invention, in each of the above described optical recording media of the present invention, the optical recording medium is further provided with a coupling portion between the substrate and the elastic body layer at a peripheral portion of the optical recording medium. In this case, the bonding strength at the peripheral portion of the optical recording medium can be improved.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a table for explaining results of experiments in case of changing a dye;

FIG. 7 is a table for explaining results of experiments in case of changing a silicon polymer; and FIG. 8 is a table for explaining results of experiments in case of using other adhesive polymers.

DETAILED DESCRIPTION OF THE PREFERRED EMBODIMENTS

Referring to the accompanying drawings, preferred embodiments of the present invention will be now explained.

First Embodiment

Figure 1:
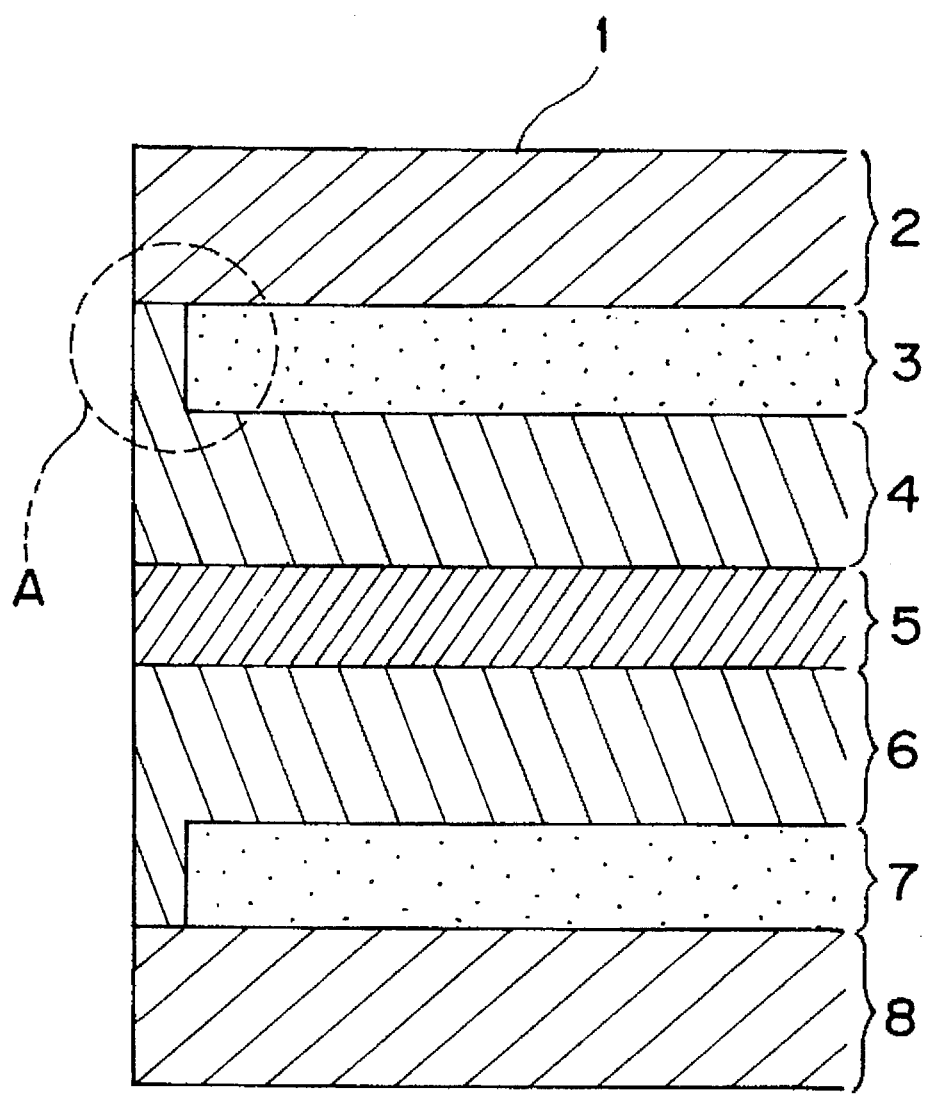
FIG. 1 is a cross sectional view showing the construction of an optical disc of a first embodiment of the present invention.

FIG. 1 shows a cross sectional view of an optical disc of the first embodiment.

An optical disc 1 is provided with: a first substrate 2 formed of an optically transparent material such as polycarbonate, PMMA (PolyMethyl MethAcrylate) etc.; a first recording layer 3, which is formed on the first substrate 2 and which includes phthalocyanine dye; a first silicon polymer layer 4 which is the first elastic body layer; a bonding layer 5 for bonding the first silicon polymer layer 4 and a second silicon polymer layer 6; the second silicon polymer layer 6 which is the second elastic body layer; a second recording layer 7 having the same construction as the first recording layer 3; and a second substrate 8 having the same construction as the first substrate 2.

Here, the concrete construction of the first recording layer 3 and the second recording layer 7 are explained. In the following explanation, since the first recording layer 3 and the second recording layer 7 have the same construction, only the first recording layer 3 is explained.

In the first recording layer 3, the phthalocyanine dye is included.

The phthalocyanine dye is expressed by the following general formula.

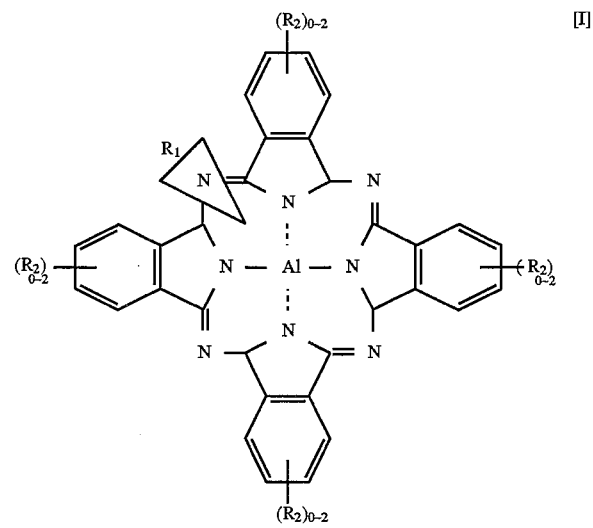

In the above mentioned general formula [I], $R_1$ represents one of —H, —OH, —OCH$_3$ and:

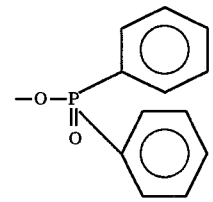

On the other hand, $R_2$ represents a component as following.

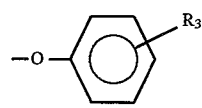

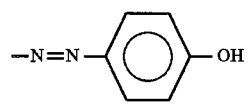

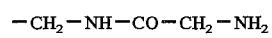

-continued

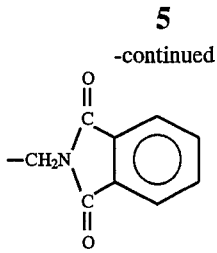

Here, $R_3$ represents one of —H, —Cl and —$CH_3$.

The thickness of the first recording layer 3 is 20 to 150 nm, and preferably 30 to 110 nm. If the thickness is less than 20 nm, there arises a problem that the ideal recording cannot be performed since it runs short of the recording sensitivity, while there arises a problem that it runs short of the reflection coefficient if this value exceeds 150 nm.

As the solvent used for coating, various known materials are used, and, for example, diacetone alcohol, 2-ethoxyethanol, 2-methoxyethanol, isophorone, methanol, tetra fluoropropanol and so on, are listed up.

Nextly, the concrete construction of the silicon polymer layer is explained.

As the silicon polymer layer, the hardness according to the hardness test of JIS-A type spring method (hereinbelow, it is referred to as a JIS-A hardness) is not more than 30 (degrees) and the film thickness thereof is normally not less than 100 μm.

Figure 2:
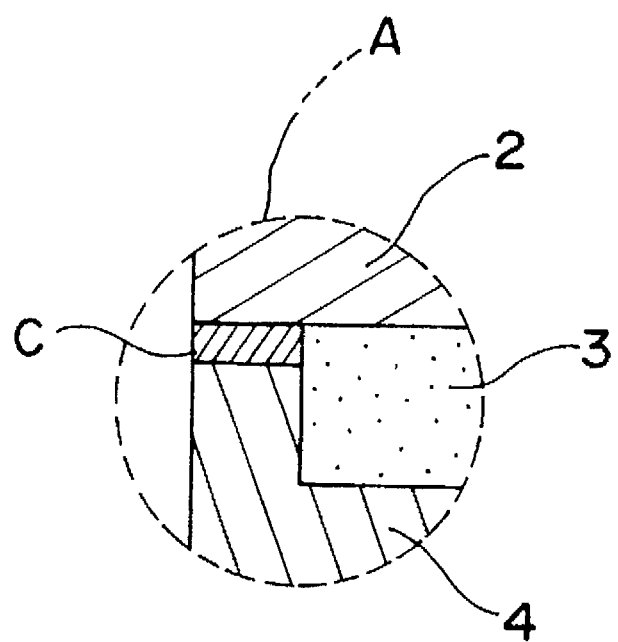
FIG. 2 is a partial magnified view of the optical disc of FIG. 1.

On the other hand, in order to increase the bonding strength of the silicon polymer layer (4) at the peripheral portion of the optical disc, as shown in the partial magnified view of FIG. 2 (which shows an A portion of FIG. 1), it is preferable to coat a coupling agent C between the silicon polymer layer (4) and the substrate (2) to form a coupling portion therebetween. As the coupling agent C, for example, the MEI53 made by TOSHIBA SILICON CO. is listed up here.

Hereinbelow, the basic structure of the silicon polymer is shown.

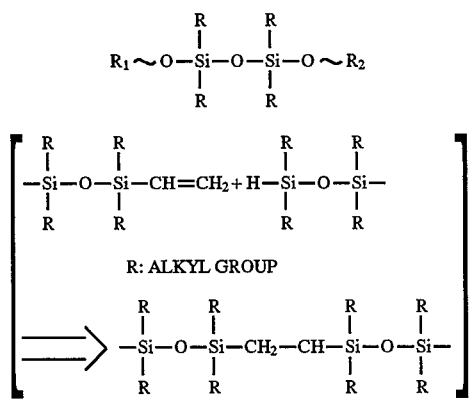

Figure 3:
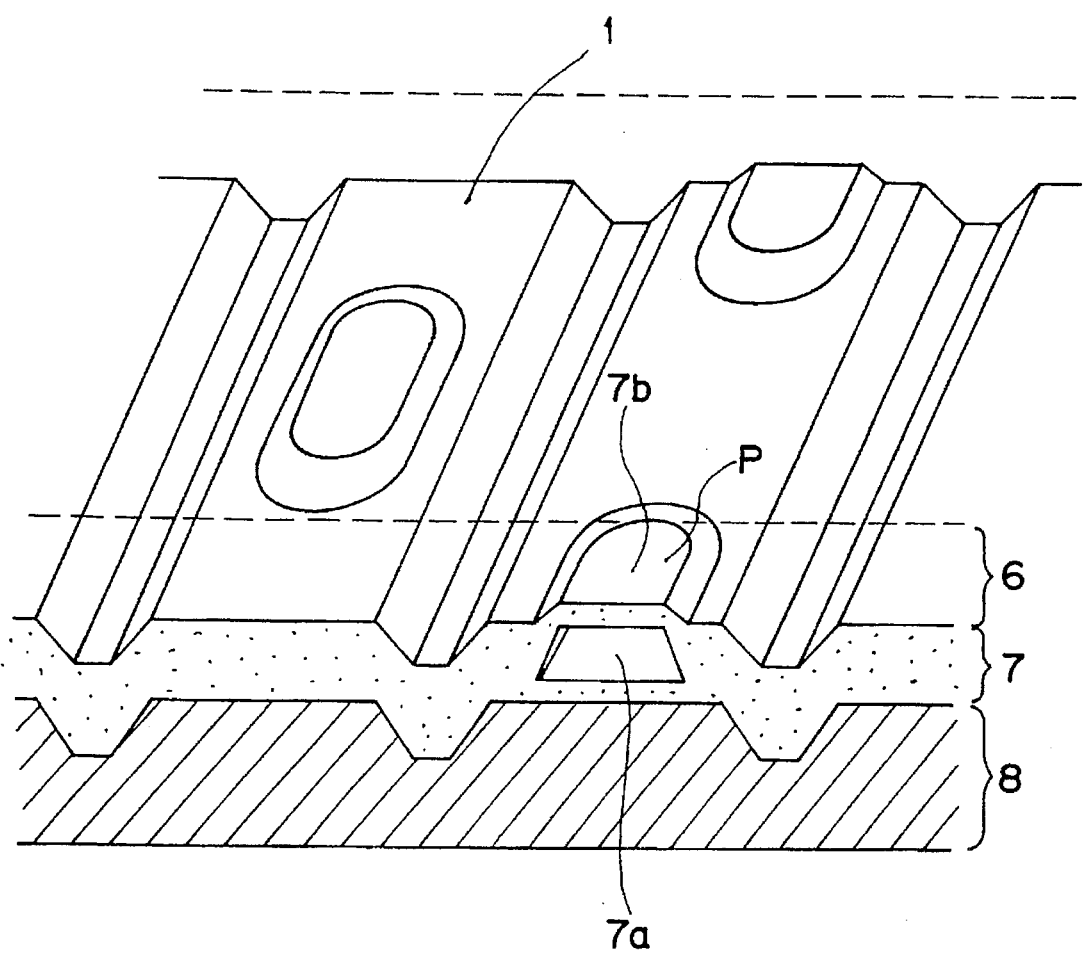
FIG. 3 is a partial cross sectional perspective view showing the construction of the optical disc of the first embodiment.

FIG. 3 shows a more detailed partial cross sectional perspective view of the optical disc 1 of FIG. 1.

As shown in FIG. 3, when the laser beam having a predetermined laser power is irradiated, the phthalocyanine dye included in the second recording layer 7 is solved and sublimed in the second recording layer 7, so that an empty portion 7a is formed while a capsule portion 7b is formed by pressing the second silicon polymer layer 6, resulting in that the record pit P is formed.

At this time, at the time of forming the capsule portion 7b, the pressure of the second silicon polymer layer 6 is applied. Accordingly, the enlargement of the pit size is restrained, the cross-talk amount due to the physical shape of the pit is reduced, and the required recording power is also small.

In the above mentioned first embodiment, the optical disc of the bonding type is constructed. However, it is possible to construct it to be used as the optical disc of single substrate type by use of the first substrate 2, the first recording layer 3 and the first silicon polymer layer 4. Further, by forming a protection layer of PMMA etc. on the first silicon polymer layer of this optical disc of single substrate type, it is possible to improve the protection ability of the recording surface of the optical disc.

Second Embodiment

Figure 4:
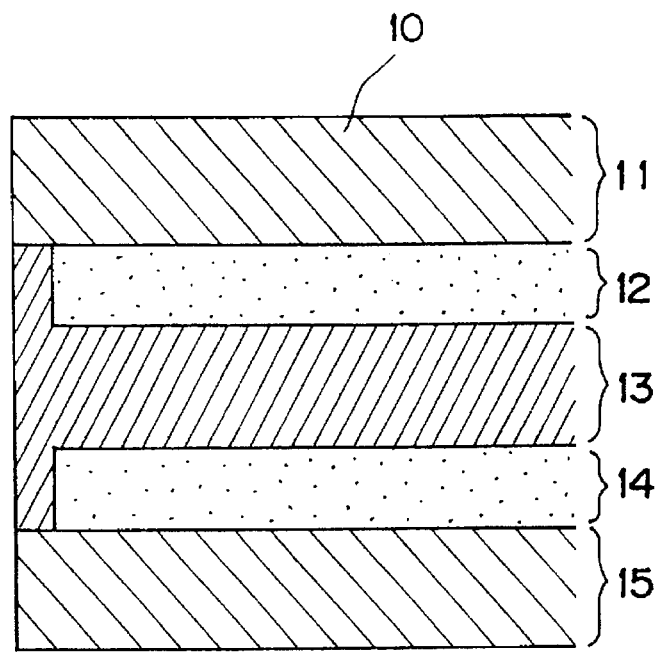
FIG. 4 is a cross sectional view showing the construction of the optical disc of a second embodiment of the present invention.

FIG. 4 shows a cross sectional view of an optical disc of the second embodiment.

An optical disc 10 is provided with: a first substrate 11 formed of an optically transparent material such as polycarbonate, PMMA etc.; a first recording layer 12, which is formed on the first substrate 11 and which includes phthalocyanine dye; a silicon polymer layer 13 which is the elastic body layer; a second recording layer 14 having the same construction as the first recording layer 12; and a second substrate 15 having the same construction as the first substrate 11.

The point where the optical disc 10 of the second embodiment different from the optical disc 1 of the first embodiment is the point where an adhesive type silicon polymer is used for the silicon polymer layer 13 to have the functions of the first elastic body layer (i.e. the first silicon polymer layer 4), the bonding layer 5 and the second elastic body layer (i.e. the second silicon polymer layer 6) in the first embodiment, so that it can make the formation process of the disc simplified.

The points other than that are the same as the first embodiment.

Third Embodiment

Figure 5:
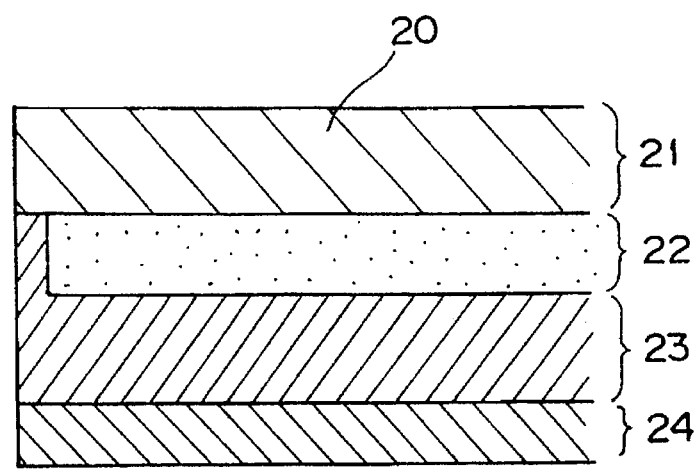
FIG. 5 is a cross sectional view showing the construction of the optical disc of a third embodiment of the present invention.

FIG. 5 shows a cross sectional view of an optical disc of the third embodiment.

An optical disc 20 is provided with: a substrate 21 formed of an optically transparent material such as polycarbonate, PMMA etc.; a recording layer 22, which is formed on the substrate 21 and which includes phthalocyanine dye; a silicon polymer layer 23 which is the elastic body layer; and a protection layer 24.

The point where the optical disc 20 of the third embodiment different from the optical disc 1 of the first embodiment is the point where it is constructed in the single substrate type and the protection layer 24 is provided, so that it can make the formation process of the disc even more simplified.

By virtue of the protection layer 24 of PMMA etc. formed on the silicon polymer layer 23, it is also possible to improve the protection ability of the recording surface of the optical disc.

The points other than that are the same as the first embodiment.

CONCRETE EXPERIMENTAL EXAMPLES

[I] Recording Layer

Firstly, the concrete experimental examples in case of using various dyes for the recording layer are shown.

a) Experimental Examples

The first recording film (or the second recording film) is formed as following. Namely, as the phthalocyanine dye included in the first recording layer and the second recording layer, the phthalocyanine having the basic structure specified by the following formula (II) is used, is solved in the 2-ethoxyethanol solvent, and is coated on the polycarbonate substrate, which has the diameter of 30 cm, with the thickness of about 50 nm by means of the spinner coating method.

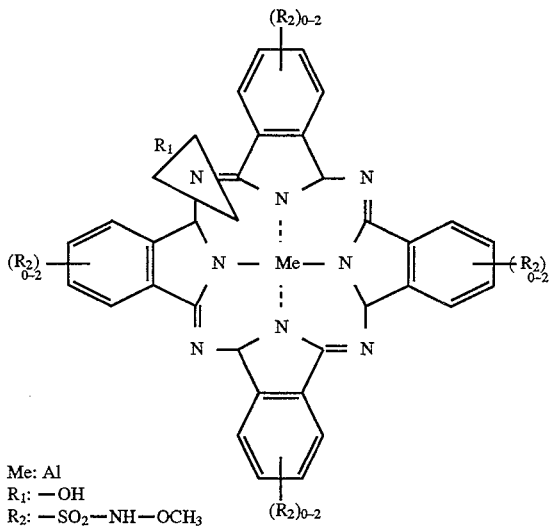

[II]

Me: Al
$R_1$: —OH
$R_2$: —$SO_2$—NH—$OCH_3$

The concrete condition of the spinner coating method is as following.

solvent: 2-ethoxyethanol
concentration of the coating solution: 28±5 mg/ml
condition of spinner:

1) 250 rpm (25 sec)

↓

2) 600 rpm (12 sec)

↓

3) 1400 rpm (20 sec)

↓

4) 2000 rpm (30 sec)

There is no difference if the following materials are used as $R_2$.

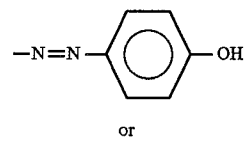

or

—$CH_2$—NH—CO—$CH_2$—$NH_2$ b) Comparison Example 1

As the phthalocyanine included in the first recording layer and the second recording layer, the phthalocyanine having the basic structure specified by the formula [II] is used, wherein Me, $R_1$ and $R_3$ are specified as following.

Me: Si
$R_1$: —$(OH)_2$
$R_2$: —$SO_2$—NH—$OCH_3$

There is no difference if the following components are used as $R_2$.

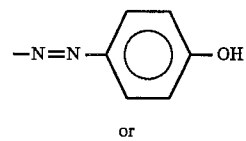

or

—$CH_2$—NH—CO—$CH_2$—$NH_2$

The conditions other than that are the same as those in the aforementioned experimental example.

c) Comparison Example 2

As the phthalocyanine included in the first recording layer and the second recording layer, the phthalocyanine having the basic structure specified by the formula [II] is used, wherein Me, $R_1$ and $R_3$ are specified as following.

Me: Al
$R_1$: —OH
$R_2$: —$SO_2$—$NH_2$

The conditions other than that are the same as those of the experimental examples.

d) Comparison Example 3

The recording layer is formed in the condition same as the aforementioned experimental example except that, in place of the phthalocyanine included in the first recording layer and the second recording layer, the cyanine dye specified by the following formula [III] is used.

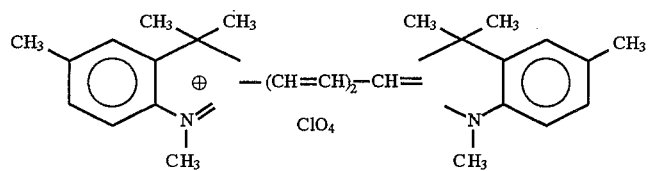

[III]

The concrete condition of the spinner coating method is as following.

solvent: diacetone alcohol
concentration of the coating solution: 17±5 mg/ml condition of spinner:

1) 0 rpm
   ↓ (2 sec)
2) 200 rpm (27 sec)
   ↓ (1 sec)
3) 900 rpm (20 sec)
   ↓ (1 sec)
4) 1600 rpm (27 sec)
   ↓ (1 sec)
5) 3000 rpm (10 sec)

e) Comparison Example 4

The recording layer is formed in the condition same as the aforementioned experimental example except that, in place of the phthalocyanine included in the first recording layer and the second recording layer, the cyanine dye specified by the following formula [IV] is used.

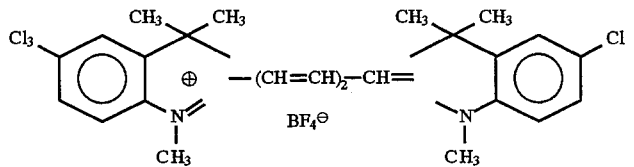

[IV]

The concrete condition of the spinner coating method is as following.

solvent: diacetone alcohol
concentration of the coating solution: 17±5 mg/ml
condition of spinner:

1) 0 rpm
   ↓ (2 sec)
2) 200 rpm (27 sec)
   ↓ (1 sec)
3) 900 rpm (20 sec)
   ↓ (1 sec)
4) 1600 rpm (27 sec)
   ↓ (1 sec)
5) 3000 rpm (10 sec)

As for those optical recording media, the recording and reproduction of the 2–3 modulated signal (the shortest pit length: 0.66 μm) are performed under the following conditions. The evaluation result of the evaluation of the reproduced wave form from the view point of the bit error rate is shown in the table of FIG. 6.

recording condition:
  laser oscillation wavelength=667 nm
  N.A. (Numerical Aperture)=0.55
  linear velocity=13.4 m/sec
  (the recording power in each example is shown in FIG. 6, in which the peak power at the time of outputting from the objective lens is indicated)

reproduction condition:
  reproduction power=0.5 mW

It is confirmed that, as shown in FIG. 6, according to the experimental example of the present invention, the bit error rate is low as compared with the comparison examples (i.e. it is $2.0 \times 10^{-6}$ in case of land recording, and $1.6 \times 10^{-4}$ in case of groove recording), the ordinary recording can be stably performed, and the stable reproduced wave form can be obtained.

[Elastic Body Layer]

Firstly, the concrete experimental examples in case of changing the JIS-A hardness by use of various silicon polymers as the elastic body layer.

As the silicon polymer, the silicon polymers shown below are used. Those are all made by TOSHIBA SILICON CO.

a) JIS-A hardness=60 (type No. TSE3331)
b) JIS-A hardness=36 (type No. XE14-257)
c) JIS-A hardness=30 (type No. TSE3033)
d) JIS-A-hardness=22 (type No. TSJ3130)
e) gel condition (type No. TSE3012)

The recording layer including the phthalocyanine shown by the formula [I] is formed by using each of those as the elastic body layer. Then, the recording and reproduction of the 2–3 modulation signal (the shortest pit length: 0.66 μm) are performed under the conditions listed below. The evaluation result of the evaluation of the reproduced wave form from the view point of the bit error rate, is shown in the table of FIG. 7.

recording condition:
  laser oscillation wavelength=667 nm
  N.A.=0.55
  linear velocity=13.4 m/sec
  (the recording power in each example is shown in FIG. 7, in which the peak power at the time of outputting from the objective lens is indicated)

reproduction condition:
  reproduction power=0.5 mW

It is confirmed that, as shown in FIG. 7, if the silicon polymer having the JIS-A hardness of not more than 30 is used, the bit error rate is relatively low (i.e. it is $2.0 \times 10^{-6}$ to $6.6 \times 10^{-5}$ in case of land recording, and $1.4 \times 10^{-4}$ to $2.5 \times 10^{-3}$ in case of groove recording), the normal recording can be stably performed, and the stable reproduced wave form can be obtained.

Nextly, the result of the experiment in case of forming it by use of other adhesive type polymers as the elastic body layer in place of the silicon polymer, is shown in the table of FIG. 8.

As the adhesive type polymer, the following polymers are used.

a) water urethane emulsion group polymer b) epoxy group polymer c) silicon/epoxy group polymer d) styrene/butadiene rubber polymer Then, the results are that the color defects are generated in the dye film, or the recording cannot be performed.

As explained above in detail, according to the present embodiments, it is possible to reduce the size of the pit, and the cross-talk due to the shape is not generated. Further, since it is not necessary to employ the air sandwich structure as the disc structure, it is strong even if it is thin even in the case of forming one disc by bonding two discs together so as to enable the recording and reproduction on both sides, and that the disc having the large area can be produced. Furthermore, since the recording is performed by the closed space which is different from the air sandwich structure, the energy at the time of recording can be utilized in a concentrated manner, so that the power at the time of recording can be reduced.

According to the present embodiments, by utilizing the elastic strength of the elastic body layer, the pit shape can be reduced, so that the cross-talk due to the shape is not generated.

Further, since it is possible to bond two substrates together through the elastic body layer, and since it is not necessary to employ the air sandwich structure as the disc structure, it becomes possible to produce the disc which has the large area, and which is thin but strong even in the case of producing one disc by bonding two discs together so as to enable the recording and reproduction on both sides.

Furthermore, different from the air sandwich structure, since the recording layer is formed in the closed space, the energy at the time of recording can be utilized in the concentrated manner, so that the power at the time of recording can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical recording medium comprising:

a first substrate of optically transparent type;

a first recording layer formed on one surface of said first substrate, said first recording layer having a thickness of 20–150 nm and comprising a phthalocyanine dye of the formula

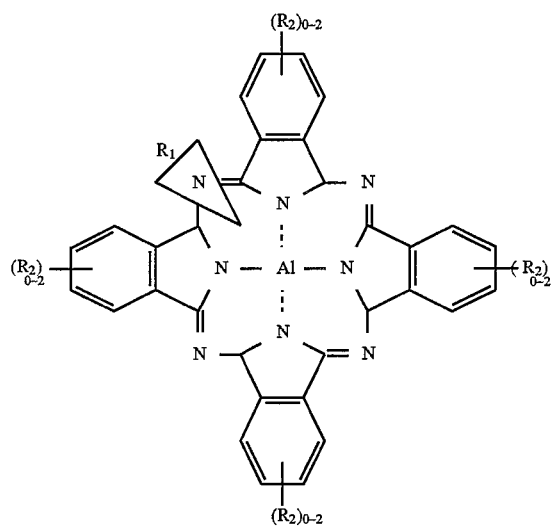

wherein $R_1$ is selected from the group consisting of —H, —OH, —O $CH_3$ and

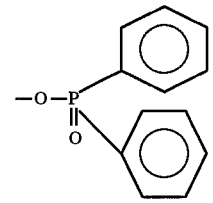

and wherein $R_2$ is selected from the group consisting of $R_2$= —H

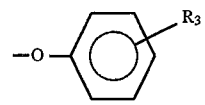

—$OCH_3$

—$OCH_2CH_3$

—$OCH_2OCH_3$

—$SO_2$—NH—$OCH_3$

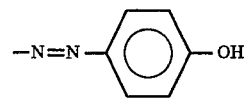

—$CH_2$—NH—CO—$CH_2$—$NH_2$, and

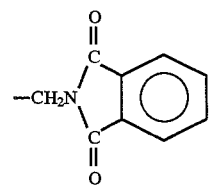

in which $R_3$ is selected from the group consisting of —H, —Cl and —$CH_3$;

a second substrate of optically transparent type;

a second recording layer formed on one surface of said second substrate, said second recording layer having a thickness of 20–150 nm and including said phthalocyanine dye; and an elastic body layer formed between said first recording layer and said second recording layer, said elastic body layer being a silicon polymer having a JIS-A hardness of not more than 30.

2. The optical recording medium according to claim 1, further comprising:

a first coupling portion between said first substrate and said elastic body layer at a peripheral portion of said optical recording medium; and a second coupling portion between said second substrate and said elastic body layer at the peripheral portion.

3. An optical recording medium comprising:

a first substrate of optically transparent type;

a first recording layer formed on one surface of said first substrate, said first recording layer having a thickness of 20–150 nm and comprising a phthalocyanine dye of the formula

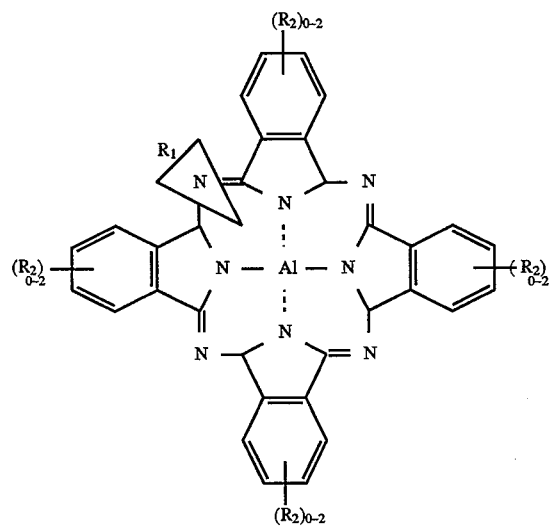

wherein $R_1$ is selected from the group consisting of —H, —OH, —O $CH_3$ and

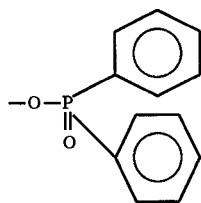

and wherein $R_2$ is selected from the group consisting of $R_2=$ —H

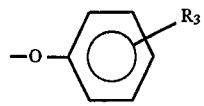

—$OCH_3$

—$OCH_2CH_3$

—$OCH_2OCH_3$

—$SO_2$—NH—$OCH_3$

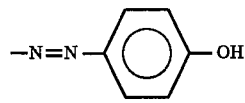

—$CH_2$—NH—CO—$CH_2$—$NH_2$, and

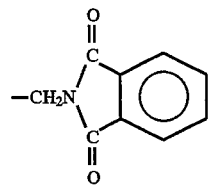

in which $R_3$ is selected from the group consisting of —H, —Cl and —$CH_3$;

a second substrate of optically transparent type;

a second recording layer formed on one surface of said second substrate, said second recording layer having a thickness of 20–150 nm and including said phthalocyanine dye;

a first elastic body layer formed on a surface of said first recording layer at a side opposite to said first substrate, said first elastic body layer being a silicon polymer having a JIS-A hardness of not more than 30;

a second elastic body layer formed on a surface of said second recording layer at a side opposite to said second substrate, said second elastic body layer being a silicon polymer having a JIS-A hardness of not more than 30; and a bonding layer formed between said first elastic body layer and said second elastic body layer.

4. The optical recording medium according to claim 3, further comprising:

a first coupling portion between said first substrate and said elastic body layer at a peripheral portion of said optical recording medium; and a second coupling portion between said second substrate and said elastic body layer at the peripheral portion.

* * * * *